United States Patent [19]

Wakita et al.

[11] 4,172,665
[45] Oct. 30, 1979

[54] METHOD OF POSITIONING A BORING MECHANISM IN A STERN TUBE

[75] Inventors: Kiyoyuki Wakita, Kitayasaku; Masaharu Suzuki, Yokohama, both of Japan

[73] Assignee: Nippon Kokan Kabushiki Kaisha, Tokyo, Japan

[21] Appl. No.: 795,082

[22] Filed: May 9, 1977

[30] Foreign Application Priority Data

May 7, 1976 [JP] Japan .................................. 51/51306

[51] Int. Cl.$^2$ ............................................. G01B 11/26
[52] U.S. Cl. ..................................... 356/400; 356/153
[58] Field of Search ................ 356/138, 153, 172, 400

[56] References Cited

U.S. PATENT DOCUMENTS

| | | | |
|---|---|---|---|
| 3,551,057 | 12/1970 | Hamilton et al. | 356/153 |
| 3,603,691 | 9/1971 | Hamilton | 356/172 |
| 3,813,171 | 5/1974 | Teach et al. | 356/172 |
| 3,902,810 | 9/1975 | Hamar | 356/172 |
| 3,907,435 | 9/1975 | Roodvoets | 356/138 |

*Primary Examiner*—John K. Corbin
*Assistant Examiner*—R. A. Rosenberger
*Attorney, Agent, or Firm*—Moonray Kojima

[57] ABSTRACT

A method and system of positioning a boring mechanism in a stern tube, wherein a hollow boring bar having a plurality of laser detecting devices in the hollow portion thereof and an adjusting mechanism corresponding to each of the detectors on the outside of the bar supported within the tube, and a laser beam is directed down the center line of the bar. The detector and auxiliary circuits detect when the laser beam is off center and signals a control means to adjust the corresponding adjusting mechanism and thus the position of the boring bar until the laser beam is again centered.

5 Claims, 2 Drawing Figures

METHOD OF POSITIONING A BORING MECHANISM IN A STERN TUBE

BACKGROUND OF THE INVENTION

This invention relates to an improved method and system of positioning a boring mechanism in a stern tube, such as in ship-building, and more particularly, to such a method and system employing a laser beam to accomplish the centering of the boring mechanism in the tube.

In the prior art, there are various methods and systems for centering a boring bar within a stern tube. For example, one prior art method employs the following steps. First, a center point is established on both ends of the stern tube. Then, a circle of a predetermined desired radius is marked from the center point of the two ends of the stern tube. Thereafter, a deflection amount of the bar at the marked position is calculated from a deflection curve premeasured on a surface plate. Then, bolt and bearings for supporting the bar within the tube are adjusted corresponding to the calculated deflection amount. The deflection amount at the middle of the bar is revised based on the above deflection curve through a dial gauge or the like set to an intermediate reading.

Unfortunately, there are many difficulties and deficiencies in the prior art methods and systems, such as those above discussed. For example, when the boring bar is set up, it is difficult to measure the deflection amount from a marking line so that precise accuracy is not obtained. Moreover, for large dimension tubes, even if an operator enters the stern tube, longitudinal slippage is barely measurable. Also, it is necessary to prepare the pre-measured deflection curve on the surface plate of every ship-building. Furthermore, there is no method or system existing in the art which would insure the retaining of the center position of the boring bar after revising or correcting the deflection. Thus, slippage from the center line of machining is difficult to detect and correct.

Up to now, no effective and suitable counter measure has been developed.

SUMMARY OF THE INVENTION

This invention has been developed to overcome the above and other deficiencies and difficulties. The invention encompasses a hollow boring bar having a plurality of center detecting devices, and a plurality of adjusting and supporting mechanisms corresponding to each center detecting device, arranged on the outside of the bar supported within a stern tube. Next, a laser beam is directed down the center line of the boring bar. Variance from the center line is detected by the laser center detecting devices when the laser beam goes off center. The variance or slippage, or in other words, the detected amount of deflection, is revised or corrected by adjusting the corresponding adjusting mechanism, which moves the suitable parts of the bar vis-a-vis the stern tube.

An object of the invention is to provide a stable method and system for positioning of a boring bar within a stern tube.

A feature of the invention is the use of a laser beam directed down the center line of a boring mechanism and use of detectors to detect when the laser beam is off center and then directing signals to a control means to cause the adjusting mechanism to move corresponding parts of the boring mechanism to thereby bring the laser beam back on center.

DETAILED DESCRIPTION OF PREFERRED EMBODIMENTS

Figure 1:
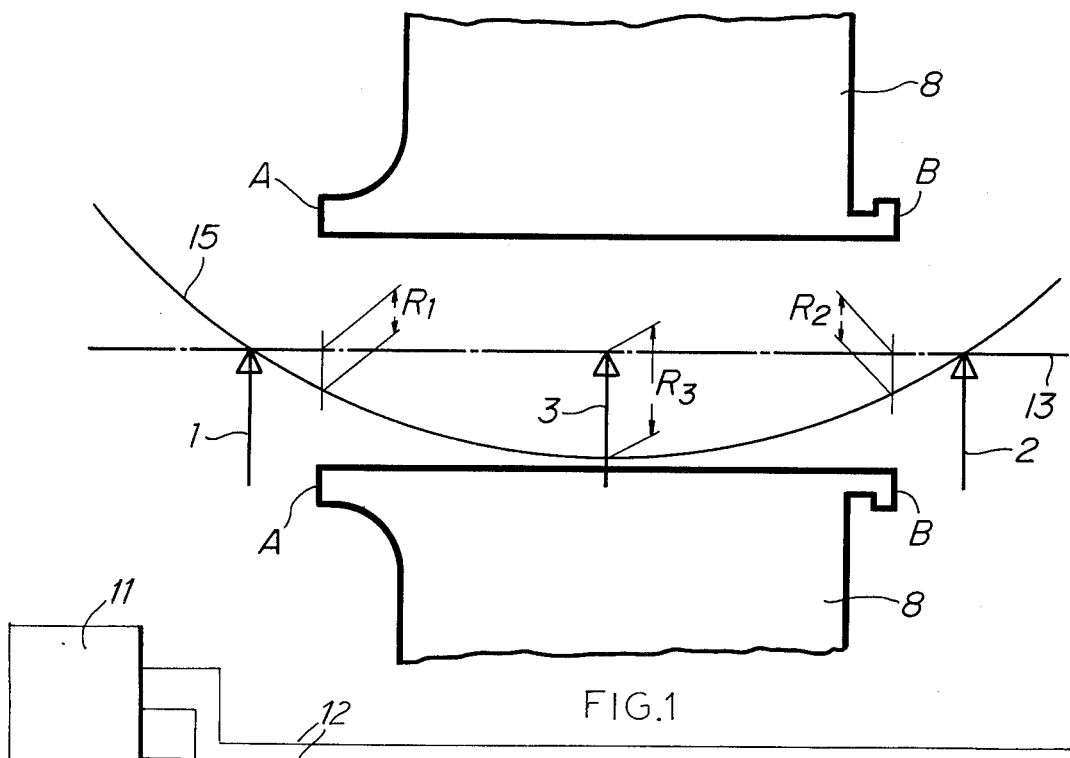
FIG. 1 is an explanatory view showing a deflecting mechanism in a stern tube.

Generally, a boring mechanism for a stern tube comprises a boring bar, supporting bearing, motor, reduction gears, feeding gears, and a cutting tool. In illustrating the operation of such boring mechanism, FIG. 1 shows pictorially, the stern tube 8, center line 13 of a boring bar disposed within the stern tube, adjusting mechanisms 1,2 and 3 for adjusting the position of the bar within the stern tube, and a deflection curve, wherein $R_1$ and $R_2$ show each of the deflection amounts of the boring bar at the marked end faces which are calculated from a deflection curved as measured on a surface plate. $R_3$ is the deflection amount at the middle of the boring bar. These deflection amounts are measured corresponding to the locations of the adjusting mechanisms, as shown. Circular markings A and B, as above discussed, are first made on the end surfaces to delineate the boring within the stern tube. The mechanisms used for control and boring, such as motors, gears, control and feed back circuits, and cutting tools, are not shown in detail in both FIGS. 1 and 2. They may be obtained in any industrial manual.

Figure 2:
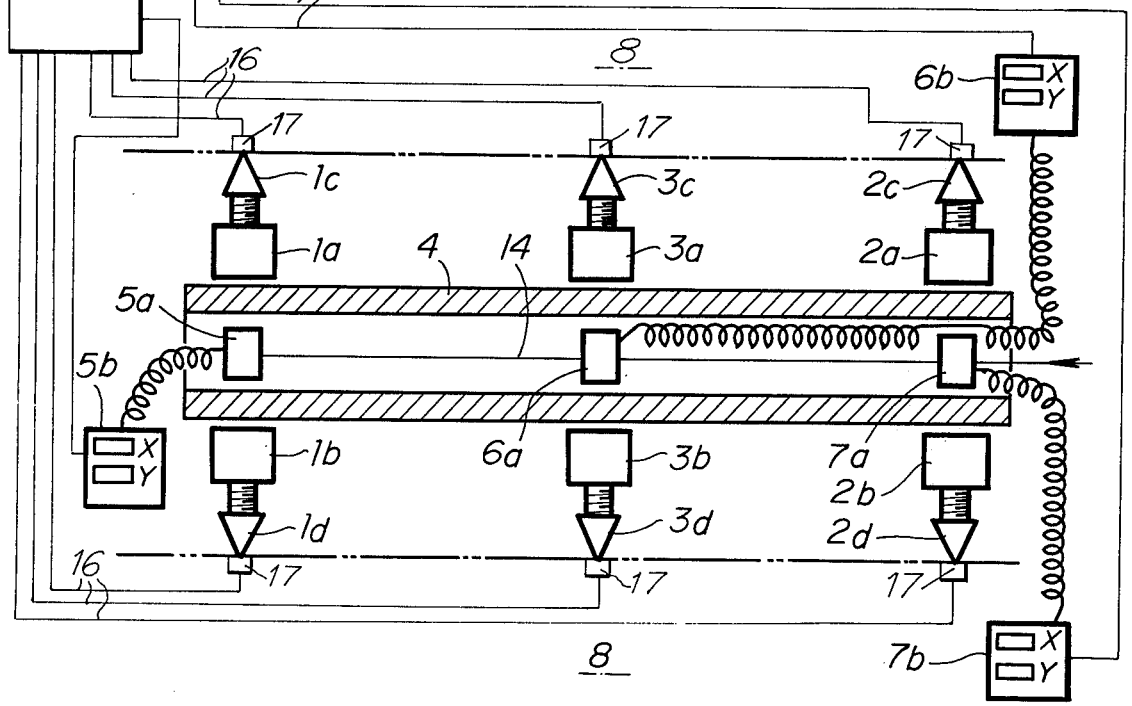
FIG. 2 is a pictorial view of an illustrative embodiment of the invention.

FIG. 2 depicts pictorially an illustrative embodiment of this invention, which corrects the deflection amounts such as shown in FIG. 1. In FIG. 2 adjusting bolts-bearing units 1a,1b,1c,1d; 2a,2b,2c,2d and 3a,3b,3c,3d, correspond to arrows 1,2 and 3, respectively, in FIG. 1. A hollow boring bar is used in this invention. A plurality of center detecting devices 5a,6a, 7a are arranged in the hollow portion of the boring bar 4. These detectors may by of any suitable type which detects laser beams. The detectors should suitably detect the magnitude and direction of the beam vis-a-vis the center line of the bar. The detector 7a is placed at the end of the bar at which the laser beam 14 is applied. The middle detector 6a may be of the transmission type, wherein the laser beam is detected as to the position, but also the laser beam is transmitted onto the next detector. The detector 5a is a non-transmission type wherein the laser beam is detected but is not further transmitted. The detectors are connected to indicators 5b,6b,7b, respectively, as shown. The indicators may be located either outside the bar or within the bar. The detectors are arranged concentrically within the bar.

The indicators 5b,6b,7b are connected through transmission wires 12 to control circuit 11, which may be of a known type performing the functions to be discussed hereinbelow. The indicators 5b,6b,7b may be of known types wherein vertical and horizontal signals and magnitudes may be displayed. Control circuit 11 is connected to motor-gear mean 17 through leads 16 as depicted. The control circuit and motor-gear means are depicted only symbollically, but any suitable known types may be employed provided the functions discussed are performed. In the foregoing manner, whenever the detectors 5a,6a,7a detect the laser beam 14 as being off center, such indicating signals are sent to indicator means 5b,6b,7b, respectively, via leads not numbered. Then, either manually, or automatically, through control means 11, by signals sent via leads 12, the control circuit 11 will then send signals via leads 16 to motor-gear means 17 of the appropriate bolt adjusting means 1a,1b,1c,1d; 2a,2b,2c,2d and 3a,3b,3c,3d to cause the motor-gear means 17 to turn the bolts to appropriately cause the bar at the corresponding parts to suitably be moved so that the laser beam 14 is again centered.

As can be seen, the cutting tools and other auxiliary equipment are not shown, but any suitable known types may be used as now done in the art.

The illustrative embodiment may be operated in the following manner. The hollow bar 4 is placed in the stern tube 8 and the above mentioned equipment, such as the detectors, indicators, adjusting bolts and bearing devices, are suitably set up and adjusted, so that the laser beam 14 is centered. A laser beam from any suitable known source, not shown, is directed into the hollow space of bar 4 substantially along the center line. The center detecting devices 5a,6a, 7a which are arranged to detect any variations of the laser beam from the center line detects every slippage in direction, such as the horizontal and vertical axis, and magnitude of deviation from the center line of the bar 4, and the detected values are transmitted to indicators 5b,6b,7b, which then may display the values, for example on the horizontal and vertical axis and the magnitude of deviation from center. A human operator upon seeing the deviations on the indicators, may manually operate the adjusting mechanism and bring the laser beam back to center. This can also be done automatically by the indicator signals being sent from indicator means 5b,6b,7b via wires 12 to control circuit 11, and in the event there is deviation from the center line of the laser beam 14, the control circuit can signal via lines 16 to the appropriate motor-gear means to suitably turn the adjusting bolt and bearing means until the laser beam is again on center.

The control circuit 11 and motor-gear means 17 are shown only symbolically, but their functions would be readily apparent to the worker, from the foregoing description.

In the above embodiment, three detector units and corresponding indicators and adjusting mechanisms are shown. However, it is understood that any suitable number may be employed. In accordance with the invention, the adjustment may be made after boring or during boring, simply and efficiently.

The foregoing description is illustrative of the principles of the invention. Numerous other variations and modifications thereof would be apparent to the worker skilled in the art. All such variations and modifications are to be considered to be within the spirit and scope of the invention.

What is claimed is:

1. In a system for positioning an apparatus, comprising a plurality of detector means, means for producing a laser beam, a plurality of adjusting means and control means responsive to said detector means for operating said adjusting means; the improvement comprising a hollow boring bar inserted within the hollow center of a stern tube of a ship, said plurality of detector means disposed within said hollow of said boring bar, said laser bean being directed along the center line of said stern tube, and said plurality of adjusting means being disposed outside of said boring bar and within said stern tube in corresponding relation to said plurality of detector means and whereby responsive to said detector means having said laser beam impinging thereon, said control means causes said adjusting means to move said boring bar portions corresponding to particular ones of said adjusting means to be positioned substantially parallel to the said center line of said stern tube.

2. The system of claim 1, wherein there are at least three said detecting devices and at least three said adjusting means corresponding thereto.

3. The system of claim 2, wherein the detecting device located in the middle is of a transmission type.

4. A method of positioning a boring mechanism in a stern tube, comprising the steps of
   (A) inserting into said stern tube a hollow boring bar having a plurality of laser detecting device in the hollow portion thereof and a plurality of adjusting means located outside of said bar to adjust the position of said bar within said tube;
   (B) directing a laser beam into the center line of said boring bar;
   (C) detecting said laser beam by said detecting devices;
   (D) transmitting a signal to an indicator circuit corresponding to each of said detecting devices to determine the position of said laser beam at the particular detecting position; and
   (E) responsive to said signal, adjusting said adjusting mechanism to cause the bar to be positioned to have said laser beam again on center.

5. The method of claim 4, wherein one of said detectors is of a transmission type.

* * * * *